(12) United States Patent
Miura

(10) Patent No.: US 6,631,640 B2
(45) Date of Patent: Oct. 14, 2003

(54) METHOD AND APPARATUS FOR MEASURING DYNAMIC BALANCE

(75) Inventor: Hiroki Miura, Hachioji (JP)

(73) Assignee: Kokusai Keisokuki Kabushiki Kaisha, Tokyo (JP)

( * ) Notice: Subject to any disclaimer, the term of this patent is extended or adjusted under 35 U.S.C. 154(b) by 93 days.

(21) Appl. No.: 09/801,292

(22) Filed: Mar. 7, 2001

(65) Prior Publication Data

US 2001/0020387 A1 Sep. 13, 2001

(30) Foreign Application Priority Data

Mar. 13, 2000 (JP) .................................... 2000-068014

(51) Int. Cl.[7] ............................................. G01M 1/16
(52) U.S. Cl. ............................... 73/462; 73/457; 73/460
(58) Field of Search .................. 73/462, 460, 464, 73/468, 471, 1.82, 455, 457

(56) References Cited

U.S. PATENT DOCUMENTS

| | | | | |
|---|---|---|---|---|
| 3,939,715 A | * | 2/1976 | Davis ........................... | 73/462 |
| 4,134,303 A | | 1/1979 | Davis ........................... | 73/660 |
| 4,510,809 A | * | 4/1985 | Fillion ......................... | 73/457 |
| 4,513,619 A | * | 4/1985 | Widdall ....................... | 73/455 |
| 4,868,762 A | * | 9/1989 | Grim et al. .................. | 700/279 |
| 5,025,662 A | * | 6/1991 | Hultberg ...................... | 73/459 |
| 5,149,936 A | * | 9/1992 | Walton, II ............... | 219/121.65 |
| 5,396,436 A | * | 3/1995 | Parker et al. ................ | 700/279 |
| 5,540,615 A | * | 7/1996 | Murtuza ...................... | 451/343 |
| 5,544,073 A | | 8/1996 | Piety et al. .................. | 364/508 |
| 5,748,588 A | * | 5/1998 | Maeda et al. ............. | 369/53.32 |
| 5,760,302 A | * | 6/1998 | Moradi et al. ................ | 73/462 |
| 5,800,331 A | * | 9/1998 | Song ........................... | 494/10 |
| 5,824,898 A | * | 10/1998 | Brooks et al. ........... | 360/98.06 |
| 5,877,420 A | * | 3/1999 | Moradi et al. ................ | 73/462 |
| 5,922,952 A | * | 7/1999 | Moradi et al. ................ | 73/462 |
| 6,098,022 A | * | 8/2000 | Sonnichsen et al. ........ | 702/190 |
| 6,189,371 B1 | * | 2/2001 | Hirano .......................... | 73/66 |
| 6,389,895 B2 | * | 5/2002 | Colarelli et al. .............. | 73/460 |
| 6,397,675 B1 | * | 6/2002 | Colarelli et al. .............. | 73/462 |
| 6,422,074 B1 | * | 7/2002 | Colarelli et al. ............ | 700/279 |

* cited by examiner

*Primary Examiner*—Herzon Williams
*Assistant Examiner*—Jacques Saint-Surin
(74) *Attorney, Agent, or Firm*—Pitney, Hardin, Kipp & Szuch LLP

(57) ABSTRACT

A method and an apparatus for accurately measuring an initial imbalance deviating from a predetermined imbalance, when the predetermined imbalance is to be left in a body of rotation. In the method and apparatus, data relating to the predetermined imbalance is stored in a memory 27 as dummy value information. The vibration of a crank shaft 1 during rotation is detected by vibration sensors 6L, 6R to obtain analogue vibration signals WDL, WDR. The rotational angle position of the crank shaft 1 is detected by a photo sensor 8 and, in response, the above described dummy value information is converted to analogue dummy signals DLX, DLY, DRX and DRY by multi D/A converters 12L, 12R, 13L and 13R. These analogue dummy signals are removed from the analogue vibration signals to obtain analogue initial imbalance signals WL, WR, which are converted by D/A converter to obtain the digital initial imbalance value.

8 Claims, 2 Drawing Sheets

METHOD AND APPARATUS FOR MEASURING DYNAMIC BALANCE

BACKGROUND OF THE INVENTION

This invention relates to a method and an apparatus for measuring a dynamic balance of a tested member, capable of measuring the imbalance to be removed of a tested member which should have a predetermined dynamic imbalance remaining therein.

That is, in case a dynamic balance of a crank shaft for an engine of an automobile, for example, is to be measured, it must be taken into account that, when a crank shaft is rotated with being built in an automobile, several additional members such as a piston, a connecting rod and so on are mounted thereto.

In other words, it is meaningless to measure a dynamic imbalance of a tested crank shaft itself. It should rather be measured whether there is the imbalance to be removed of a tested crank shaft for allowing the crank shaft to be rotated without vibrating when the related members are mounted thereto.

In order to measure such an imbalance of a tested member as described above, there have been employed the following three methods.

In a first method, a plurality of dummy rings corresponding to the imbalance to remain are attached to respective portions of the crank shaft, when rotated to determine correction amounts and angle positions therefor.

In a second method, a crank shaft is connected on a vibration stand to a spindle which carries a dummy weight equivalent to the predetermined imbalance to remain, when rotated to determine correction amounts and angle positions therefor.

In a third method, a crank shaft itself is rotated without attaching any dummy ring or dummy weight, and the imbalance of the rotating crank shaft is detected by a vibration sensor as an analogue signal which is then converted to digital signal by an A/D converter (Analogue-Digital converter). Thereafter, a numerical calculation is conducted based on the detected digital value and a digital dummy value obtained in advance and corresponding to the imbalance to remain, i.e., the latter is subtracted from the former, thereby finding an initial imbalance and deciding correction amounts and angle positions therefor.

It should be noted here that the balance adjustment of the crank shaft after the above described measurement based on the above described correction amounts and angular positions is performed by making a drill hole at the optimum position with the optimum depth on the counter weight of the crank shaft.

However, the above described first method requires attaching and detaching of dummy rings for each crank shaft to be measured. Further, when crank shafts of various types are to be measured by the same measuring apparatus, different dummy rings for different types have to be respectively prepared and replaced each time. Moreover, for these reasons, it is difficult to automate the measurements with this method.

Although the second method does not require attaching or detaching of dummy rings for respective crank shafts, it requires replacing dummy weights when different type crank shafts are to be measured by the same measuring machine.

The third method requires neither attaching nor replacing of dummy rings or dummy weights so that it is suitable for automation of the measurements, but is hard to attain measurements with high accuracy because of the following reasons.

That is, the imbalance data obtained by a vibration sensor is the sum of the imbalance to remain and that to be removed as described above. Although the imbalance to remain is different depending on the type of a crank shaft, some reaches a level of several thousand gcm. In contrast, the imbalance to be removed is rather smaller, i.e., generally of a level of several hundred gcm.

Accordingly, the maximum size of the imbalance data obtained by the vibration sensor comes to several thousand and several hundred gcm.

On the other hand, the voltage which can be inputted to the A/D converter is usually limited to below ±5V, and the full scale of the input range of the A/D converter should be made to correspond to the possible maximum value of the imbalance data measured by the above sensor.

By doing so, however, the imbalance measurable per one digit by the A/D converter becomes larger (i.e., the resolution of the A/D converter becomes low) as the above maximum value becomes larger and, hence, the measurement with the resolution higher than the above becomes impossible. That is, the resolution becomes worse due to the presence of the relatively large imbalance to remain, and therefore the measurement with high accuracy for the imbalance to be removed becomes difficult.

SUMMARY OF THE INVENTION

It is therefore an object of the present invention to provide a method and an apparatus for measuring a rotational balance of a tested member which should have a predetermined imbalance remaining therein, capable of accurately detecting the imbalance to be removed, without requiring a dummy ring, a dummy weight or the like.

The measuring method of the present invention is such that the digital dummy value information equivalent to a dummy portion is stored in a memory in advance and a rotation sensor detects the rotational angular position of the body of rotation as a workpiece and, in response to this rotational angular position, digital dummy value information is read out from the memory, accompanied by which these pieces of information are converted to an analogue dummy signal and then the analogue vibration signal obtained by detecting the rotational vibration amount of the body of rotation by a rotational vibration sensor and the analogue dummy signal are synthesized so as to obtain the analogue signal of the initial imbalance portion by removing the dummy portion from the imbalance portion, after which this analogue signal is digital-converted so as to obtain the digital initial imbalance value.

The above described digital dummy information is desirably stored in a memory for each different type of the apparatus and which is, every time the type of the workpiece changes, made to switch over to the dummy value information corresponding to the type changed. In this manner, an automatic measurement becomes possible while the workpieces of different types may follow on the same measuring apparatus. Morever, when the initial analogue imbalance signal is digitalized, it is desirable that the approximate maximum value of the initial analogue signal is made to correspond to the full scale measurable by the A/D converter. Also, the analogue signals are preferably divided into components orthogonal to each vibration direction, which are generated by the cosine waveform and the sine waveform completely synchronized with the body of rotation, respectively.

The rotational balance measuring apparatus of the present invention is provided with a rotational support portion for supporting the body of rotation as a work, which is provided with an electrical motor capable of rotatingly driving this body of rotation. Also, a rotation sensor for detecting the rotational angular position of the body of rotation is provided and a vibration sensor for obtaining an analogue vibration signal by detecting the vibration of the above described body of rotation through the rotational support portions provided. On the other hand, a memory for storing the dummy value information as a digital data of the imbalance to be left over in the body of rotation is provided and a controller for outputting the above described dummy value information based on the rotational angular position signal from the above described rotation sensor is provided. With this outputted digital dummy value information inputted, a D/A converter for converting this information to an analogue dummy signal is installed and a wave synthesizing circuit is installed where the analogue dummy signal obtained here and the analogue vibration signal from the above described rotation sensor are inputted and wave-synthesized so as to obtain an analogue initial imbalance signal by removing the analogue dummy signal portion from the analogue vibration signal. To this wave synthesizing circuit, a A/D converter is connected where the analogue initial imbalance signal is inputted and converted to a digital imbalance signal.

The above described D/A converter is preferably configured by a D/A converter for producing a wave of one directional component of the analogue dummy signals based on the COS waveform and a D/A converter for producing a waveform of the component orthogonal to the above described one direction of the analogue dummy signals based on the SIN waveform for each of the vibrational directions orthogonal to each other.

Morever, it is preferable that the above described dummy information is made to correspond to the result obtained by measuring by a master workpiece as the predetermined imbalance to be left over in advance and at least the size and the angular position of the imbalance at a measured rotational speed of the body of rotation are stored in a memory in terms of a digital value. That is, the master work is rotated in a state of being attached with a dummy weight equivalent to the predetermined imbalance portion of this master work and is corrected and balanced by measuring by a rotational balance measuring device. After this, the analogue signal obtained by the vibration sensor by measuring the rotational balance of the master work piece with the dummy weight is digital-converted and taken as the data of the digital dummy value. In order to obtain the dummy value information by this master work piece, it is desirable to use the rotational balance apparatus similar to the one used for measuring the work piece as hereinafter described.

Also, the waveform synthesizing circuit may be preferably capable of complying with either a waveform addition circuit or a waveform subtraction circuit by changing the plus and minus of the wave to be inputted, in short, capable of obtaining the analogue initial imbalance signal by removing the analogue dummy signal portion from the above described vibration signal.

Morever, the rotational support portion of the rotational balance apparatus may be configured preferably by a bearing for supporting the outer periphery of both ends of the body of rotation or by a spindle for supporting both ends of the rotation axis along the rotation center axis of the body of rotation.

The measuring method and the measuring apparatus of the present invention are configured as described above and therefore have the following effects.

For example, supposing that the size of the dummy portion is 4,500 gcm and the size of the initial imbalance portion which has to be adjusted in the crank shaft itself as a result of deviation from the dummy portion is 500 gcm, the size of the detection value detected by the vibration sensor is a sum of both of the above values which is 5,000 gcm.

When the measurement is made by the above described conventional third method, the full scale of the measurement range in the A/D converter has to be made to correspond to at least the above described sum which is 5,000 gcm.

If the full scale of the A/D converter is below ±5 and its resolution is 12 bits, the above described conventional third method will obtain the accuracy of 5,000 gcm+2048 digits+ 2.44 gcm/digit only and the measurement of a level smaller than this becomes impossible.

In contrast, according to the measuring method and the measuring apparatus of the present invention, 4,500 gcm of the above described dummy portion are taken as the analogue signal of the initial imbalance portion only where by addition or subtraction of analogue signals the dummy portion is removed from the analogue vibration signal of the vibration sensor. That is, the size of the signals inputted to the A/D converter is equivalent to a maximum of 500 gcm only. Accordingly, if this is digital-converted by the above described A/D converter, 500 gcm±2048 digits=0.244 gcm/digit and, according to the measuring method and the measuring apparatus of the present invention, ten times the resolution is obtained in contrast to the above described third method and the measurement accuracy is greatly improved. Consequently, even in the case where the amount of the predetermined imbalance is large, the initial rotational imbalance can be made far smaller than that of the conventional technology.

DESCRIPTION OF THE ACCOMPANYING DRAWINGS

The invention will now be described by way of example and with reference to the accompanying drawings, in which.

DETAILED DESCRIPTION OF THE EMBODIMENTS

Figure 1:
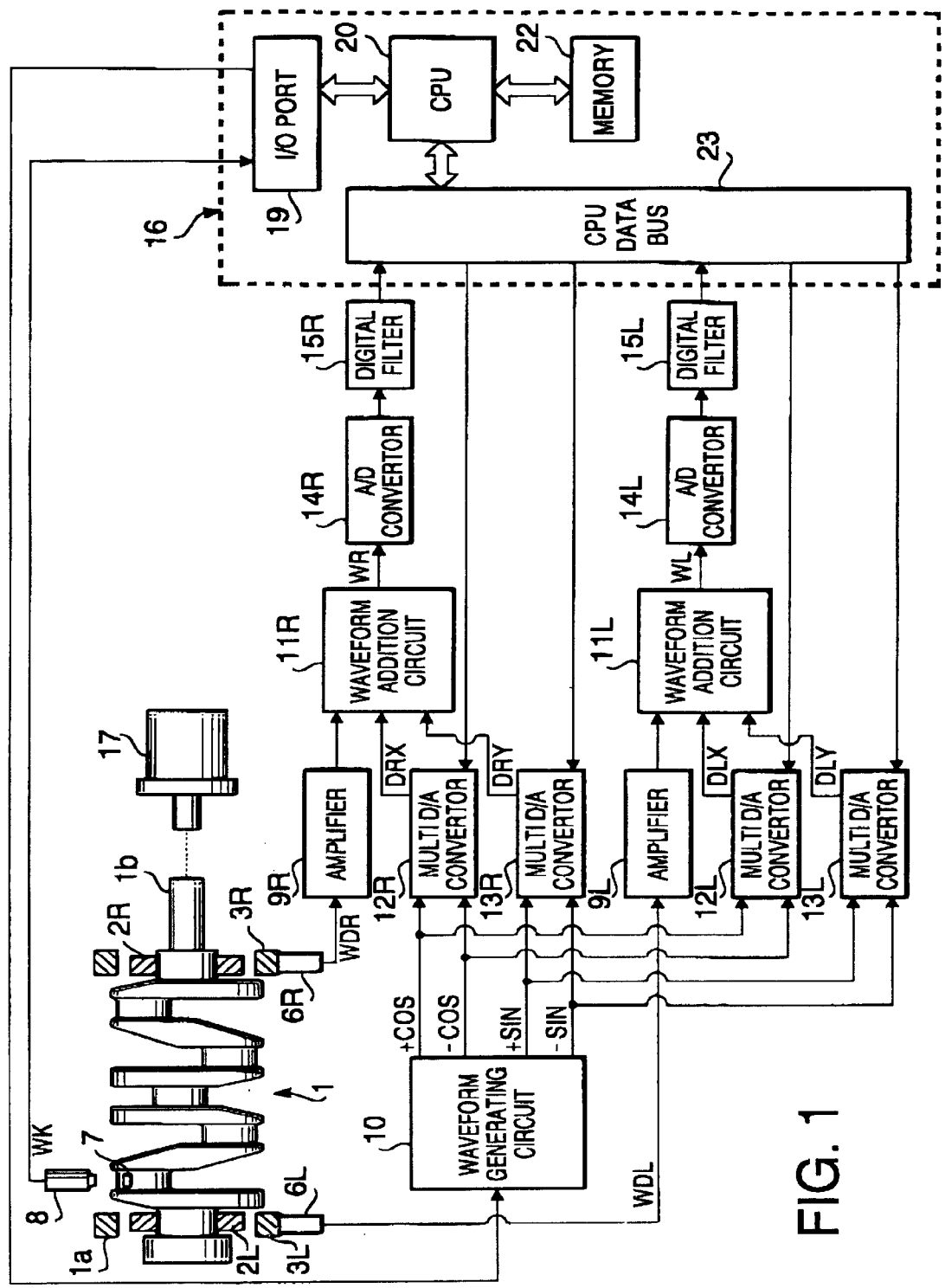
FIG. 1 is a schematic view showing a measuring apparatus embodying the invention.

FIG. 1 shows a measuring apparatus embodying the invention, wherein reference numeral 1 denotes a crank shaft (workpiece) as a tested member. A work supporting structure of the measuring apparatus is shown in FIG. 2 in an enlarged fashion.

Figure 2:
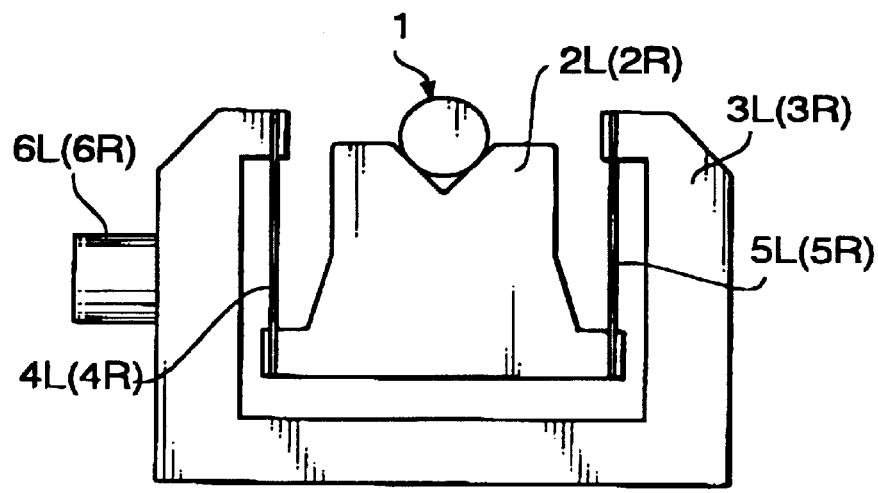
FIG. 2 is a side view showing the relationship between a tested member, a workpiece support mechanism and a vibration sensor of the measuring apparatus shown in FIG. 1.

As shown in FIGS. 1 & 2, end portions of the crank shaft 1 are rotatably supported by a pair of bearing members 2L & 2R, respectively. The bearing members 2L & 2R are supported by a pair of mounting bases 3L & 3R, respectively, via springs 4L & 5L and 4R & 5R, such that the bearings 2L & 2R are displaceable with respect to the mounting bases 3L & 3R in response to the vibration of the crank shaft 1 generated upon rotation thereof. The mounting bases 3L & 3R are secured to a base frame, not shown.

Vibration sensors 6L & 6R are attached respectively to the amounting bases 3L & 3R so as to detect the vibrating of the crank shaft 1 through the mounting bases 3L & 3R. As a vibration sensor, in case a so-called soft type balancer is adopted where the springs 4L, 5L, 4R & 5R are relatively soft ones, a moving pick-up of, for example, a vibration speed detection type is to be employed. On the other hand, in case a so-called hard type balancer is adopted where the springs 4L, 5L, 4R & 5R are blade springs of high rigidity, a moving system pick-up of, for example, a piezoelectric element type or a vibration speed detection type of high sensitivity is to be employed as the displacements of the bearing members 2L & 2R are small.

Returning to FIG. 1, the crank shaft 1 is arranged to be driven to rotate by means of an electric motor 17 coupled to one end 1b (an engine output side) thereof. On a pin portion near the other end 1a of the crank shaft 1, a photo mark 7 is attached while a photo sensor 8 is arranged above the pin portion for facing the photo mark 7. The photo sensor 8 continuously emits a light beam toward the photo mark 7 to receive the light beam reflected by the photo mark 7. Every time the photo mark 7 comes to face the photo sensor 8 upon rotation of the crank shaft 1, the photo sensor 8 receives the reflected light beam and outputs a corresponding signal to a controller 16 so that the rotational position as well as the rotational speed of the crank shaft 1 can be detected by the controller 16.

The vibration sensors 6L, 6R are connected to waveform addition circuits 11L, 11R through amplifier circuits 9L, 9R, respectively, so that analogue vibration signals WDL, WDR detected by the vibration sensor 6L & 6R are inputted to the wave addition circuits 11L, 11R, respectively. Further, multi D/A converters 12L & 13L and 12R & 13R are connected to the wave addition circuits 11L, 11R, so that analogue dummy signals DLX & DLY and DRX & DRY outputted from the multi D/A converters are inputted to the waveform addition circuits 11L & 11R, respectively.

The multi D/A converter 12L where ±±COS signals are supplied from a waveform generating circuit 10 and the multi D/A converter 13L where ±±SIN signals are supplied from the waveform generating circuit 10 are both connected to a CPU data bus 23 of the controller 16, through which a digital dummy value for the data obtained at the bearing member 2L can be inputted. That is, when the digital dummy value is inputted to the multi D/A converters 12L & 13L, the multi D/A converter 12L produces the analogue dummy signal DLX of X direction (e.g., a horizontal vibration direction)based on the ±±COS signal while the multi D/A converter 13L produces the analogue dummy signal DLY of Y direction (e.g., a vertical vibration direction) based on the ±±SIN signal, respectively, which are outputted to the waveform addition circuit 11L. In the meantime, the signal relating to the rotational state of the crank shaft 1 detected by the rotation sensor 8 is inputted to the waveform derivation circuit 10 through the I/O port 19.

Similarly, the multi D/A converter 12R where the ±±COS signals are supplied from the waveform generating circuit 10 and the multi D/A converter 13R where the ±±SIN signals are supplied from the wave generating circuit 10 are connected to the controller 16, through which the digital dummy value is inputted. That is, when the digital dummy value read out from the memory 22 of the controller 16 in synchronization with the rotation of the crank shaft 1 is inputted to the multi D/A converters 12R, 13R, the D/A multi converter 12R produces the analogue dummy signal DRX of the X direction based on the ±±COS signals and the multi converter 13R produces the analogue dummy signal DRY of the Y direction based on the ±±SIN signals, respectively, both of which are inputted to the waveform addition circuit 11R.

The waveform addition circuit 11L allows the analogue vibration signal WDL from the left side vibration sensor 6L and the analogue dummy signals DLX and DLY from the multi D/A converters 12L and 13L to be inputted and synthesizes these synchronized analogue waveforms so as to remove the analogue dummy signal portion from the analogue vibration signal and produces the initial imbalance signal WL at the left side bearing member 2L.

Similarly, the waveform addition circuit 11R allows the analogue vibration signal WRL from the left side vibration sensor 6R and the analogue dummy signals DRX and DRY from the multi D/A converters 12R and 12L to be inputted and synthesizes these synchronized analogue waveforms so as to remove the analogue dummy signal portion from the analogue vibration signal and produces the initial imbalance signal WR at the right side bearing member 2R.

The waveform addition circuits 11L, 11R output the analogue initial imbalance signals and these signals are inputted to A/D converters 14L, 14R, respectively. The output side of each of the converters A/D 14L, 14R is connected to the CPU data bus 23 of the controller 16 through digital filters 15L, 15R. The initial imbalance signals WL, WR which are digital-converted by the A/D converters 14L, 14R are reduced in noises by the digital filters 15L, 15R to be read by the controller 16.

Next, the measurement of the initial imbalance of the crank shaft 1 will be described.

In a state of being supported by the left and the right bearing members 2L, 2R as shown in FIG. 1, the crank shaft 1 is rotated for measurement at a predetermined number of revolutions by the electrical motor 17. At this time, because a dynamic imbalance is caused to the crank shaft 1, a force in the direction of the centrifugal force is displaced in the circumferential direction. The inertial force at this time acts on the mounting bases 3L, 3R through the bearing members 2L and 2R, and the springs 4L & 5L and 4R & 5R The vibration speeds of the mounting bases 3L, 3R are detected by the vibration sensors 6L, 6R and in response to these vibration speeds, the analogue vibration signals WDL, WDR are generated respectively. These analogue vibration signals WDL, WDR are amplified respectively in the amplifier circuits 9L. 9R and, then, inputted to the waveform addition circuits 11L, 11R.

On the other hand, the photo mark 7 of the crank shaft 1 is detected by the photo sensor 8. That is, every time the rotating photo mark 7 comes to face the photo sensor 8, the photo sensor 8 generates a photo sensor signal pulse WK. This signal WK is inputted to the I/O port 19 of the controller 16. The controller 16 detects, based on the photo sensor signal pulse WK, at the CPU 20, the rotational position θ of the crank shaft 1 from the time when the pulse is generated and also the rotational speed N of the crank shaft 1 from the elapsing time between the pulses.

When the rotational speed N of the crank shaft 1 reaches the measurable range, depending upon the type of the tested crank shaft as well as upon the rotational position ?θ and the rotational speed N of the crank shaft 1 detected by the photo sensor 8, the digital dummy value information is read out from the memory 22. This digital dummy value information is transmitted to the multi D/A converter 12L, 12R, 13L and 13R, where, based on the ±±COS curves and ±±SIN curves created in the wave generation circuit 10 in synchronization with the rotation of the crank shaft 1, they are converted to the analogue dummy signals DLX, DLY, DRX and DRY and then outputted to the wave addition circuits 11L, 11R respectively.

The waveform addition circuit 11L allows the waveform of the analogue vibration signal WDL sent from the vibration sensor 6L and the waveforms of the dummy value signals DLX, DLY to be synchronized and synthesized. By this synthesizing, the analogue dummy signal portions DLX, DLY are removed from the waveform of the analogue vibration signal WDL so as to obtain the analogue initial imbalance signal WL. This analogue initial imbalance signal WL from the waveform addition circuit 11L is digital-converted by the A/D converter 14L to obtain the digital initial imbalance value. This digital initial imbalance value is inputted to the controller 6, thereby making it possible to obtain the correction amount and the angular position of the initial imbalance in the left portion of the crank shaft 1 in FIG. 1.

Similarly, the waveform addition circuit 11R allows the waveform of the analogue vibration signal WDR sent from the vibration sensor 6R and the waveforms of the dummy signals DRX, DRY to be synchronized and synthesized based on the rotational position ?θ and rotational speed N detected by the photo sensor 8. By this synthesizing, the analogue dummy signal portions DRX, DRY are removed from the waveform of the analogue vibration signal WDR so as to obtain the analogue initial imbalance signal WR. This analogue initial imbalance signal WR from the waveform addition circuit 11R is digital-converted by the A/D converter 14R to obtain the digital initial imbalance value. This digital initial imbalance value is inputted to the controller 16, thereby making it possible to obtain the correction amount and the angular position of the initial imbalance in the right portion of the crank shaft 1 in FIG. 1.

Figure 3A:
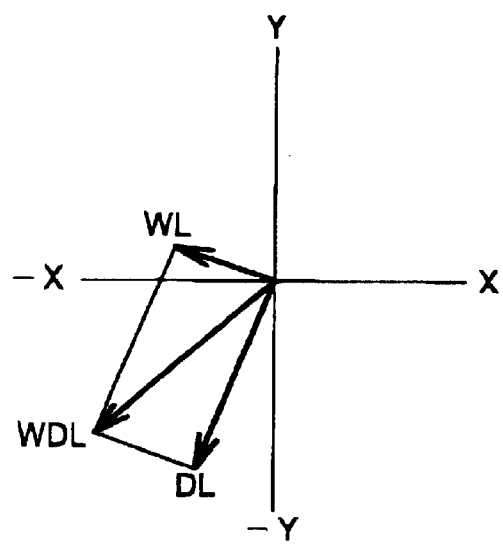
FIGS. 3A & 3B are graphs showing the total imbalance of a dummy and an initial measurement at right and left bearings of the measuring apparatus shown in FIG. 1.
Figure 3B:
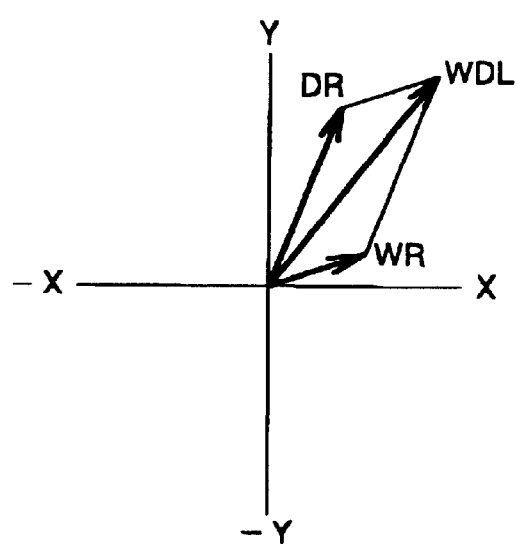

Here, the relationship between the initial imbalance signals WL, WR and the dummy imbalance signals DL, DR is as shown in FIG. 3. Note that, in the drawing, FIG. 3A shows the state at the left side bearing member 2L and FIG. 3B the state at the right side bearing member 2R. Note also that, for a clear understanding of the relationship, the initial imbalance portions WL, WR are exaggeratingly pictured in a magnified manner in contrast to the dummy signal portions DL, DR. The vibration sensors 6L, 6R are to detect WDL, WDR, which are the sum of the vectors of the above two portions. Consequently, according to the convent ional third method, the full scale measurable by the above described A/D converters 14L, 14R has to be made to correspond to the maximum possible WDL, WDR so that no excellent resolution is obtained.

In contrast, according to the present invention, the analogue initial imbalance signals WL, WR inputted to the A/D converters 14L, 14R allow the dummy portion which has a value far larger than the initial imbalance signal to be removed by the waveform addition circuits 11L, 11R and, consequently, by allowing the maximum possible size of the initial imbalance portions WL, WR which are far smaller than the WDL, WDR to correspond to the full scale measurable by each of the A/D converters 14L, 14R, can greatly improve the resolution in contrast to the above described conventional third method. As a result, even in case of the body of rotation where the predetermined imbalance is large, the imbalance can be reduced far smaller in contrast to the above described conventional method.

The present disclosure relates to subject matters contained in Japanese patent application No. 2000-068014 filed on Mar. 13, 2000, which are expressly incorporated herein by reference in its entirety.

What is claimed is:

1. A method of measuring the rotational imbalance of a test member, comprising:

rotating the test member;

obtaining an analogue vibration signal by sensing the vibration of the test member;

sensing the rotational position of the test member, and simultaneously reading out from a memory digital dummy data, based on the rotational position, which data corresponds to a predetermined imbalance to remain in the test member;

converting the digital dummy data into an analogue dummy signal, subtracting the analogue dummy signal from the analogue vibration signal to produce an analogue initial imbalance signal, and converting the analogue initial imbalance signal to a digital initial imbalance signal.

2. A method as claimed in claim 1, further comprising the step of storing in advance digital dummy data for a plurality of different types of test members, and selectively reading out the digital dummy data corresponding to the member being tested.

3. A method as claimed in claim 1, comprising obtaining the dummy data by:

adding a dummy weight equivalent in value to a predetermined imbalance to a master test member and balancing the member;

removing the dummy weight and rotating the member: sensing the vibration of the member to obtain an analogue vibration signal; and converting the signal to a digital vibration signal.

4. A method as claimed in claim 1 in which the full scale measurable by the analogue-digital converter of the initial imbalance signal corresponds to the approximate maximum value of the initial analogue imbalance signal.

5. A method as claimed in claim 1, comprising dividing the analogue dummy signal into components corresponding to orthogonal vibration directions produced by a sine wave and a cosine wave signal respectively.

6. Apparatus for measuring the rotational imbalance of a test member comprising:

a rotational support portion for supporting the test member;

means for rotating the member;

a rotation sensor arranged to detect the rotational angular position of the test member and produce a position signal;

a vibrating sensor arranged to detect the amount of vibration of the member through the support portion and produce an analogue vibration signal;

a memory storing digital dummy data corresponding to a predetermined imbalance to remain in the member;

a digital to analogue converter for converting the digital dummy data read from the memory, based on the rotational position from the rotation sensor, into an analogue dummy signal;

a wave synthesizing circuit arranged to receive the analogue vibration signal from the vibration sensor, and the analogue dummy signal from the digital to analogue converter, and to subtract the dummy signal from the vibration signal to produce an analogue initial imbalance signal; and an analogue to digital converter arranged to receive the analogue initial imbalance signal from the wave synthesizing circuit and convert the analogue initial imbalance signal into a digital initial imbalance signal.

7. Apparatus as claimed in claim 6, in which the digital to analogue converter comprises a first multi digital to analogue converter arranged to produce a cosine wave signal from the digital dummy data corresponding to one directional component of vibration, and a second digital to analogue converter arranged to produce a sine wave signal from the digital dummy data corresponding to a second directional component of vibration being orthogonal to the first directional component.

8. Apparatus as claimed in claim 6 in which the means for rotating the test member comprises an electric motor.

* * * * *